United States Patent
Thangam et al.

(10) Patent No.: US 11,481,223 B2
(45) Date of Patent: Oct. 25, 2022

(54) REDUCING OPERATIONS OF SUM-OF-MULTIPLY-ACCUMULATE (SOMAC) INSTRUCTIONS

(71) Applicant: ThinCI, Inc., El Dorado Hills, CA (US)

(72) Inventors: Kamaraj Thangam, Hyderabad (IN); Palaparthy Venkata Divya Bharathi, Hyderabad (IN); Satyaki Koneru, Folsom, CA (US)

(73) Assignee: Blaize, Inc., El Dorado Hills, CA (US)

( * ) Notice: Subject to any disclaimer, the term of this patent is extended or adjusted under 35 U.S.C. 154(b) by 109 days.

(21) Appl. No.: 16/535,309

(22) Filed: Aug. 8, 2019

(65) Prior Publication Data
US 2021/0042123 A1 Feb. 11, 2021

(51) Int. Cl.
*G06F 9/30* (2018.01)
*G06F 9/38* (2018.01)
*G06N 3/063* (2006.01)

(52) U.S. Cl.
CPC .......... *G06F 9/3836* (2013.01); *G06F 9/3001* (2013.01); *G06F 9/30036* (2013.01); *G06F 9/30065* (2013.01); *G06F 9/3802* (2013.01); *G06F 9/3887* (2013.01); *G06N 3/063* (2013.01)

(58) Field of Classification Search
CPC .. G06F 1/3001; G06F 1/3237; G06F 9/30065; G06F 9/3001; G06F 9/3887; G06F 9/3836; G06F 9/30036; G06F 17/16; G06N 3/063
See application file for complete search history.

(56) References Cited

U.S. PATENT DOCUMENTS

2010/0274990 A1* 10/2010 Wilder ................... G06F 9/3001
712/22
2011/0088041 A1* 4/2011 Alameldeen ............ G06F 9/505
718/105
2020/0409705 A1* 12/2020 Ould-Ahmed-Vall .......................
G06F 9/30021

\* cited by examiner

*Primary Examiner* — Jyoti Mehta
*Assistant Examiner* — Kasim Alli
(74) *Attorney, Agent, or Firm* — Brian R. Short

(57) ABSTRACT

Methods, systems and apparatuses for reducing operations of Sum-Of-Multiply-Accumulate (SOMAC) instructions are disclosed. One method includes scheduling, by a scheduler, a thread for execution, executing, by a processor of a plurality of processors, the thread, fetching, by the processor, a plurality of instructions for the thread from a memory, selecting, by a thread arbiter of the processor, an instruction of the plurality of instructions for execution in an arithmetic logic unit (ALU) pipeline of the processor, and reading the instruction, and determining, by a macro-instruction iterator of the processor, whether the instruction is a Sum-Of-Multiply-Accumulate (SOMAC) instruction with an instruction size, wherein the instruction size indicates a number of iterations that the SOMAC instruction is to be executed.

18 Claims, 4 Drawing Sheets

DPAC-4 (SOMAC with 4 terms) operation for instruction size=8

(instruction size sets the number of iterations)

destination_operand_iteration0 = source_operand1(4 terms) * source_operand2_iteration0(4 terms) + destination_operand_iteration0 destination_operand_iteration1 = source_operand1(4 terms) * source_operand2_iteration1(4 terms) + destination_operand_iteration1 destination_operand_iteration2 = source_operand1(4 terms) * source_operand2_iteration2(4 terms) + destination_operand_iteration2

~~destination_operand_iteration3 = source_operand1(4 terms) * source_operand2_iteration3(4 terms) + destination_operand_iteration3~~ [skip because source_operand2_iteration3 terms are zero]

destination_operand_iteration4 = source_operand1(4 terms) * source_operand2_iteration4(4 terms) + destination_operand_iteration4

~~destination_operand_iteration5 = source_operand1(4 terms) * source_operand2_iteration5(4 terms) + destination_operand_iteration5~~ [skip because source_operand2_iteration5 terms are zero]

destination_operand_iteration6 = source_operand1(4 terms) * source_operand2_iteration6(4 terms) + destination_operand_iteration6 destination_operand_iteration7 = source_operand1(4 terms) * source_operand2_iteration7(4 terms) + destination_operand_iteration7

4 terms needed for operand1 since the same 4 terms are used in each iteration.

A total of 4x8=32 terms are needed for operand2 since each iteration uses a different set of 4 terms.

FIGURE 4

REDUCING OPERATIONS OF SUM-OF-MULTIPLY-ACCUMULATE (SOMAC) INSTRUCTIONS

FIELD OF THE EMBODIMENTS

The described embodiments relate generally to graph stream processing. More particularly, the described embodiments relate to methods, apparatuses and systems for reducing operations of Sum-Of-Multiply-Accumulate (SOMAC) instructions.

BACKGROUND

Neural networks are made up of a series of layers where each layer has multiple inputs and multiple outputs. Each input and output is a two-dimensional feature map. Each input is connected to and contributes to each output in weighted fashion. The compute pipeline has operations which are fundamentally a multiply-accumulate (MAC). A MAC involves multiplying two source operands and accumulating the result into the destination operand. Variations of the MAC operations are used extensively in neural networks, including dot-product-accumulate and convolve-accumulate. The two source operands and the destination operand need to be read from the register file and fed into the compute pipeline. The operation is performed and the result accumulated into the destination and written back.

The exuction of the MAC operations and variations of MAC operations are compuationally intensive, and should be reduced if possible.

It is desirable to have a method, apparatus and system for reducing MAC operations performed during graph streaming processing.

SUMMARY

One embodiment includes a method of processing. The method includes scheduling, by a scheduler, a thread for execution, executing, by a processor of a plurality of processors, the thread, fetching, by the processor, a plurality of instructions for the thread from a memory, selecting, by a thread arbiter of the processor, an instruction of the plurality of instructions for execution in an arithmetic logic unit (ALU) pipeline of the processor, and reading the instruction, and determining, by a macro-instruction iterator of the processor, whether the instruction is a Sum-Of-Multiply-Accumulate (SOMAC) instruction with an instruction size, wherein the instruction size indicates a number of iterations that the SOMAC instruction is to be executed.

Another embodiment includes a computing system. The system includes a scheduler operative to schedule a thread, a plurality of processors operative to execute the thread, and logic encoded in one or more non-transitory computer-readable storage media for execution by the plurality of processors. When the encoded logic is executed, the a processor of the plurality of processors operates to fetch a plurality of instructions for the thread from a memory, select by a thread arbiter of the processor an instruction of the plurality of instructions for execution in an arithmetic logic unit (ALU) pipeline of the processor, and read the instruction, and determine whether the instruction is a Sum-Of-Multiply-Accumulate (SOMAC) instruction with an instruction size, wherein the instruction size indicates a number of iterations that the SOMAC instruction is to be executed.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 shows operation of a SOMAC instruction with 4 terms, wherein the instruction size of the SOMAC instruction is 8, and wherein the instruction size sets the number of iterations performed by the SOMAC instruction, according to an embodiment.

DETAILED DESCRIPTION

The described embodiments are embodied in methods, apparatuses and systems for reducing operations of Sum-Of-Multiply-Accumulate (SOMAC) instructions.

GSP (Graph Streaming processor) is a multi-threaded, SIMD (single instruction, multiple data) machine with an array of processors. For an embodiment, there exist two compute pipelines in each processor of the GSP which support many data formats such as 8 bit, 16 bit, 32 bit, 64 bit and 128 bit. A SIMD pipeline executes the instructions which operate on multiple data. The scalar pipeline operates on individual data.

Figure 1:
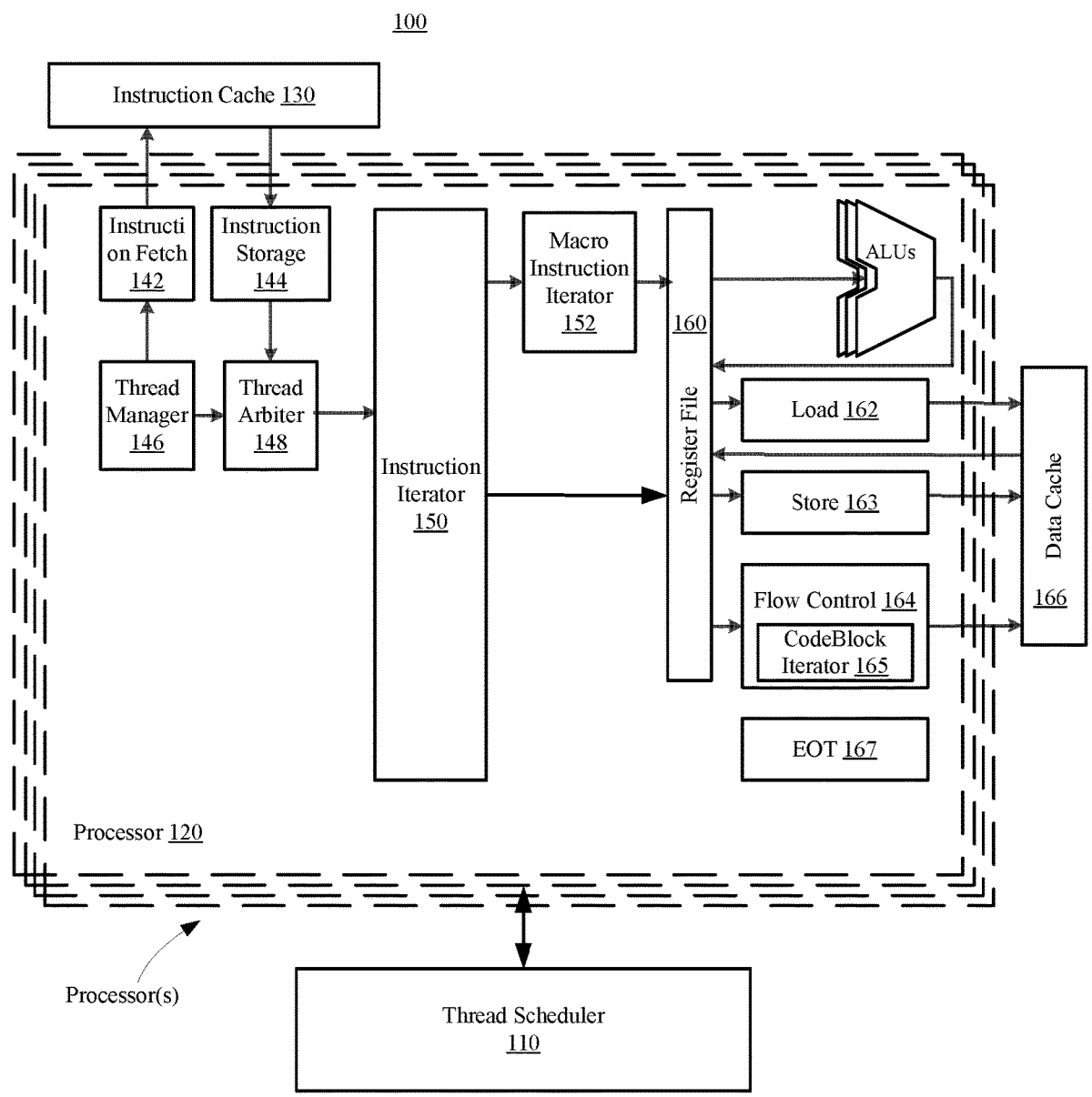
FIG. 1 shows a GSP (Graph Streaming processor), according to an embodiment.

FIG. 1 shows a GSP (Graph Streaming processor) 100, according to an embodiment. For an embodiment, the GSP 100 includes a plurality of processors including a processor 120. Further, the GSP 100 further includes a thread scheduler 110, instruction cache 130, and data cache 166. For at least some embodiments, each of the processors (including processor 120) operates to process a plurality of threads.

For an embodiment, the thread scheduler 110 includes a module that includes a series of identical stages each of which checks on the availability of resources for running a thread (for example, a thread slot, or registers) across an array of processors and dispatches the thread. For at least some embodiments, execution (processing) of an acyclic graph with multiple nodes is carried out by depth-wise mapping of the nodes to the stages. The commands to schedule threads are held in command buffers which are written into by a stage and read from by the next stage, wherein the command buffers are located between the stages.

For an embodiment, the instruction cache 130 includes a read-only cache for servicing the instruction cache-line fetch requests from the threads running on the plurality of processors.

For an embodiment, the data cache includes a read-write cache for servicing the data fetch and write-back requests from the threads running (being processed) on the plurality of processors. Further, at least some embodiments further include a device memory where operating software places all the buffers that are required for execution of the previously mentioned acyclic graph. For an embodiment, these buffers include the command buffers and data buffers.

For at least some embodiments, the processor 120 includes a thread manager 146, an instruction fetch 142, instruction storage 144, and a thread arbiter 148.

For an embodiment, the thread manager 146 includes a module that holds all the states associated with each thread. This includes the initial information at thread dispatch and the state generated during execution of the thread.

For an embodiment, the instruction fetch 142 includes a module that initiates the fetch of a cache-line (for example, 64 Bytes) of instructions from memory via the instruction cache 130.

For an embodiment, the processor 120 includes the instruction storage 144. For an embodiment, each thread includes 2 cache-line slots that enables the fetch of a second cache-line when a first cache-line is returned by the instruction cache. Thus, the execution of one cache-line worth of instructions overlaps with the fetch of the second cache-line of instructions. For an embodiment, the instruction cache is the instruction cache 130.

For an embodiment, the thread arbiter 148 manages scheduling of instructions into pipelines. For an embodiment, the availability of instructions and the absence of any dependency on prior instructions pending completion of execution make a thread a candidate for scheduling instructions into the different execution pipelines. For an embodiment, the thread arbiter 148 is responsible for fair scheduling of instructions into each of these pipelines.

The processor further includes an instruction iterator 150, and a macro instruction iterator 152. For an embodiment, the instruction iterator 150 includes a module that is responsible for sub-cycling each SIMD instruction for as many phases (iterations) as are required to complete the processing of the instruction. For an embodiment, multiple phases (iterations) are required because of a narrower register file and/or a narrower execution pipeline than an instruction SIMD (single instruction, multiple data) width. That is, data read out of a register file and/or the width of the execution pipeline is less than the instruction SIMD width.

For an embodiment, the macro instruction iterator 152 includes a module that is responsible for handling the SOMAC instructions with an instruction size. The macro instruction iterator 152 controls sequencing of a first source operand read and zero-detection of terms of the first source operand, the second source operand read and zero detection of terms of the second source operand, and the destination operand read and update.

The processor 120 further includes a register file 152. For an embodiment, the register file 152 includes a storage module, and the source and destination operands for each instruction are resident in this storage module. For an embodiment, all operations carried out by the processor 120 reside on registers in the register file. For an embodiment, data can be loaded from memory into the register file and data can be stored to memory from the register file.

For at least some embodiments, the processor 120 includes a plurality of pipelines. For an embodiment, the plurality of processors holds a number of pipelines for performing the various operations needed in the execution of code. These include the math computes, accesses from and to memory, conditional operations and thread termination. There are also multiple instances of these modules based on the throughput requirements for each of the operations.

For at least some embodiments, the pipeline processing includes an ALU (arithmetic logic unit) pipeline, a load pipeline, a store pipeline, a flow control pipeline, and an EOT (end of thread) pipeline.

A plurality of ALUs 161 enables operation of the ALU pipeline. For an embodiment, the ALUs 161 operate to perform math operations including add/subtract/multiply/divide, compares, bit-wise logical operations and data movement.

A load module 162 enables the load pipeline. For an embodiment, the load module 1162 performs the issuance of data fetches from memory.

A store module 163 enables the store pipeline. For an embodiment, the store module 163 is used for sending the results in the register file to memory.

A flow control module 164 enables the flow control pipeline. For an embodiment, the flow control module 164 handles all conditional statements including IF/ELSE/ENDIF, WHILE, ENDLOOP, BREAK, and/or CONTINUE.

A code block iterator 165 of the flow control module 164 services WALK/ENDWALK instructions.

An EOT module 167 enables the EOT pipeline. For an embodiment, the EOT module 167 handles a thread termination command and releases all resources occupied by the thread in the processor 120.

Figure 2A:
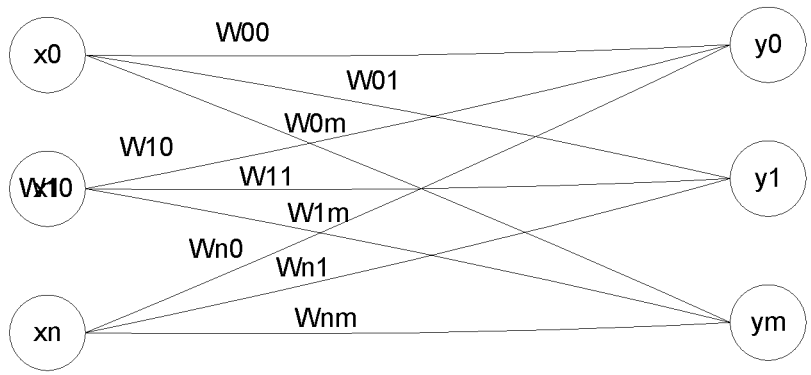
FIG. 2A shows two layers of a neural network wherein each input is connected to and contributes to each output in a weighted process, according to an embodiment.

At least some embodiments of neural networks are made up of a series of layers where each layer has multiple inputs and multiple outputs. Each input and output is a two-dimensional feature map. Each input is connected to and contributes to each output in weighted fashion. FIG. 2A shows two layers of a neural network wherein each input is connected to and contributes to each output in a weighted process, according to an embodiment.

For an embodiment, the neural network processing includes a compute pipeline having operations which are fundamentally a multiply-accumulate (MAC). A MAC involves multiplying two source operands and accumulating the result into the destination operand.

Figure 2B:
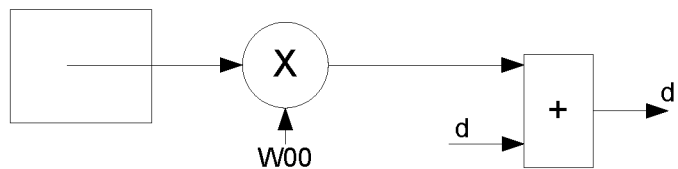
FIG. 2B shows such a MAC operation, according to an embodiment.

FIG. 2B shows such a MAC operation. That is, for example;

MAC d, s0, s1 // d=s0*s1+d

Figure 2C:
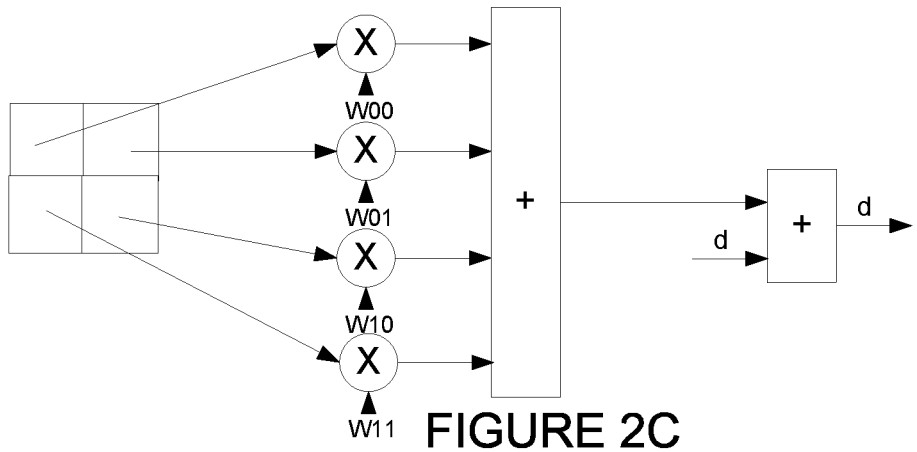
FIG. 2C shows a dot-product-accumulate, according to an embodiment.

FIG. 2C shows an example of a dot-product-accumulate operation which can be referred to as a Sum-Of-Multiply-Accumulate (SOMAC).

Figure 2D:
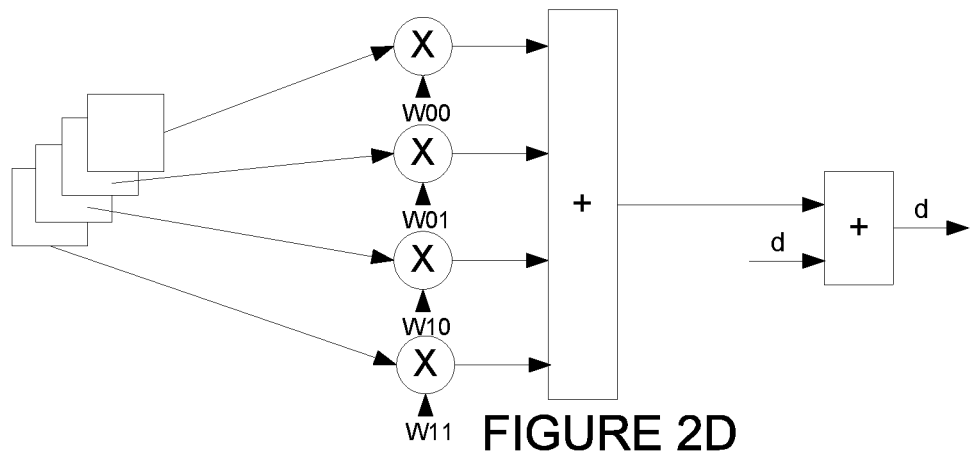
FIG. 2D shows an example of a convolve-accumulate operation, according to an embodiment.

FIG. 2D shows an example of a convolve multiple and accumulate operation which can also be referred to as a Sum-Of-Multiply-Accumulate (SOMAC).

For SOMAC operations, when either s0 or s1 are zero, the compute result is 0 which when accumulated into the destination leaves the destination unchanged. Hence, the operation can be pruned or eliminated.

In neural networks, each of the outputs is generated by performing dot-product-accumulate or convolve-accumulate operations on each of the inputs (s0) against weights (s1). Given the widespread use of these operations, pruning them provides significant benefits.

Figure 3:
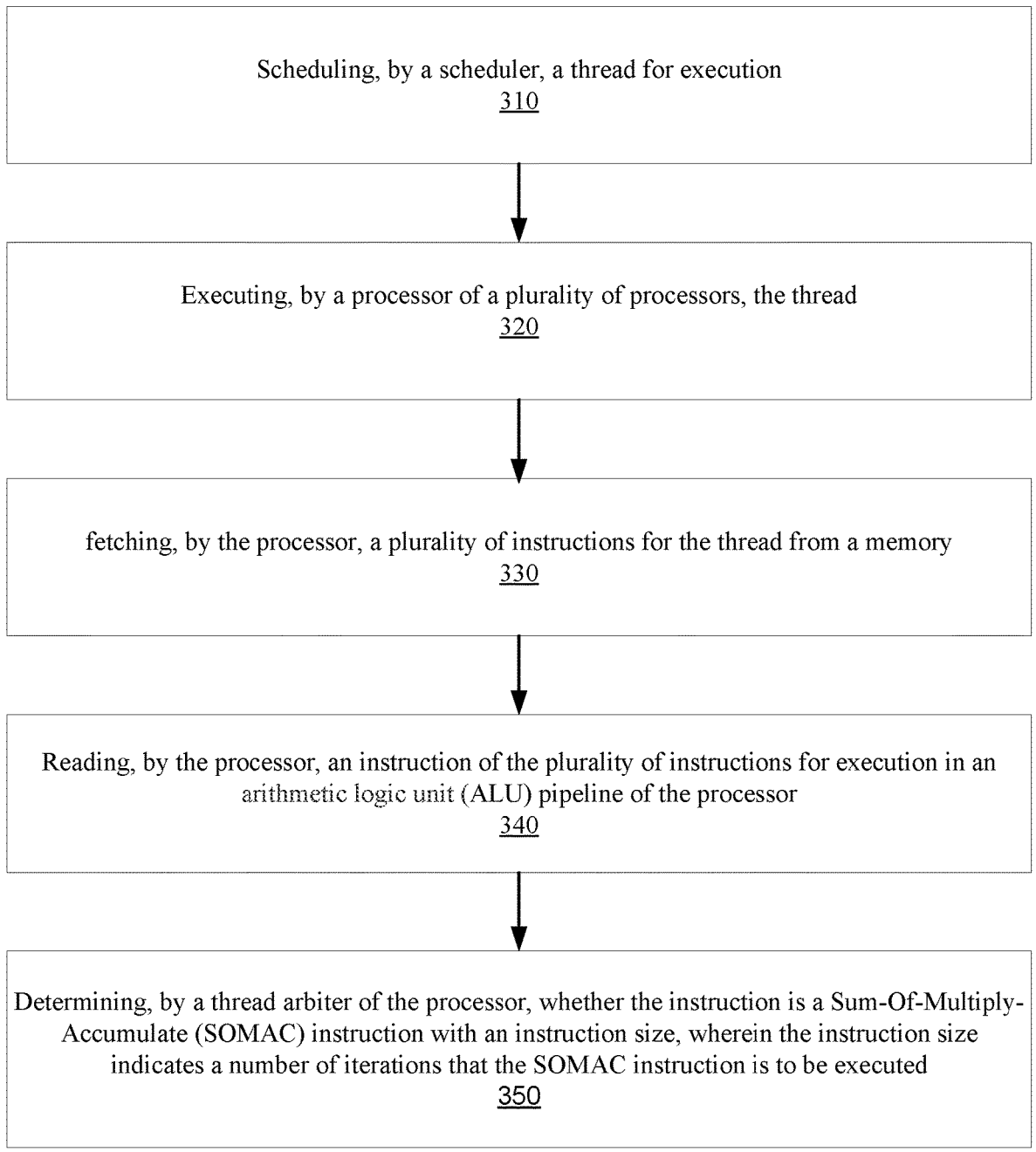
FIG. 3 is a flow chart that includes steps of a method of reducing operations of Sum-Of-Multiply-Accumulate (SOMAC) instructions, according to an embodiment.

FIG. 3 is a flow chart that includes steps of a method of reducing operations of Sum-Of-Multiply-Accumulate (SOMAC) instructions, according to an embodiment. A first step 310 includes scheduling, by a scheduler, a thread for execution. A second step 320 includes executing, by a processor of a plurality of processors, the thread. A third step 330 includes fetching, by the processor, a plurality of instructions for the thread from a memory. A fourth step 340 includes selecting, by a thread arbiter of the processor, an instruction of the plurality of instructions for execution in an arithmetic logic unit (ALU) pipeline of the processor, and reading the instruction. A fifth step 350 includes determining, by a macro-instruction iterator of the processor, whether the instruction is a Sum-Of-Multiply-Accumulate (SOMAC) instruction with an instruction size, wherein the instruction size indicates a number of iterations that the SOMAC instruction is to be executed.

For at least some embodiment, a thread is an instance of a program that is run on a processor. For an embodiment, a thread includes a set of instructions operating on input data and producing output data. The input and output data can be stored within the data cache 166.

As previously described, for an embodiment, a GSP includes a plurality of processors that processes a plurality of threads.

A one of the plurality of processors fetches a plurality of instructions for the thread from a memory. For an embodiment, the memory includes the instruction cache 130.

Further, the processor reads an instruction of the plurality of instructions for execution in an arithmetic logic unit (ALU) pipeline of the processor. The ALU pipeline is operable on one or more of the ALUs 161.

A macro-instruction iterator of the processor determines whether the instruction is a Sum-Of-Multiply-Accumulate (SOMAC) instruction with an instruction size, wherein the instruction size indicates a number of iterations that the SOMAC instruction is to be executed. If the instruction is a Sum-Of-Multiply-Accumulate (SOMAC) instruction, then there may be opportunities to reduce the number of operations of the SOMAC instruction by evaluating terms of operands of the SOMAC instruction.

For an embodiment, the compute pipeline includes operations which are fundamentally a multiply-accumulate (MAC). A MAC involves multiplying two source operands and accumulating the result into the destination operand. For example, a MAC that includes two operands A, B, and a destination operand can be represented as:

$C=A*B+C$–(Multiply-Accumulate MAC);

For at least some embodiments, variations of the MAC operations are used extensively in neural networks, such as, Sum-Of-Multiply-Accumulate (SOMAC) instructions. These include, for example, a dot-product-accumulate operation and a convolve-accumulate operation. For an embodiment, the two source operands and the destination operand need to be read from the register file and fed into the compute pipeline. The operation is performed and the result accumulated into the destination and written back. Such variations (such as, Sum-Of-Multiply-Accumulate (SOMAC) instructions) can be represented by:

$C=\Sigma A_i*B_i+C$–(Sum-Of-Multiply-Accumulate SOMAC),

Multiple iterations of this operation, as determined by the instruction size, can be further represented by a loop as:

For (j=0;j<instruction size;j++)

$C[j]=\Sigma A_i*B_i[j]+C[j]$ (SOMAC in a loop), wherein the first source operand ($A_i$) is common or shared for all iterations.

At least some of the described embodiments reduce the number of operations performed in the execution of the SOMAC instructions. For a SOMAC instruction, the instruction size refers to the number of iterations the SOMAC needs to run for and corresponds to the loop count to generate all the results of the SOMAC operations.

For an embodiment, the processor reads a first source operand of a plurality of source operands of the SOMAC instruction from a register file, wherein the first source operand includes one or more terms and is the input to the SOMAC operation. For an embodiment, each source operand of the plurality of source operands is a register from a corresponding register file that is an input to the instruction. Further, a macro-instruction iterator of the processor determines if all terms of the first source operand are zero. It is to be understood that each operand can be made up of multiple terms, such as, a dot-product-accumulate (DPAC) and convolve-accumulate (CONVAC). Standard MAC operation only includes one term.

For an embodiment, execution of the SOMAC instruction is skipped and a next instruction is read for execution when all terms of the first source operand are zero. For example, in the equations provided above, when all the terms of the operand $A_i$ are zero, then execution of all iterations of the instruction are skipped.

An embodiment includes the thread arbiter of the processor selecting a second instruction of the plurality of instructions for execution in an arithmetic logic unit (ALU) pipeline of the processor, and reading the second instruction, if the first instruction is skipped in an ALU pipeline of the processor. Further the macro-instruction iterator of the processor determines whether the second instruction is a Sum-Of-Multiply-Accumulate (SOMAC) instruction with an instruction size, wherein the instruction size indicates a number of iterations that the SOMAC instruction is to be executed.

For an embodiment, if the instruction is not skipped, the processor reads a second source operand of the plurality of source operands of the SOMAC instruction from the register file when all terms of the first source operand are not zero, wherein the second source operand includes a number of sets of one or more terms, wherein the number of sets is the instruction size. Further, the macro-instruction iterator of the processor determines an instruction mask, wherein the instruction mask includes a plurality of bits, and each bit is determined based on which sets of the number of sets of the second operand have all terms of the set being zero.

For at least some embodiments, each bit of the plurality of bits corresponding to a set of the plurality of sets of the second source operand having all terms of zero are reset (reset to zero), and each bit of the plurality of bits corresponding to a set of the plurality of sets of the second source operand having at least one term non-zero are set (set to one).

For at least some embodiments, the processor executes multiply and accumulate operations of the SOMAC operation for the iterations which are not disabled (mask bit is set) and skips the iterations which are disabled (mask bit is reset) based on the instruction mask.

For at least some embodiments, the processor reads a destination operand of the plurality of operands of the SOMAC instruction, adds a sum-of-multiply result to the destination operands, and writes the multiply-accumulate result back to the destination operand, wherein the destination operand is a register from the register file that is an output of the instruction. The destination operand is read and updated for each iteration, wherein there is a separate destination operand for each iteration. It is to be understood that, for at least some embodiments, these operations are only performed for the iterations which are not disabled (mask bit is set).

For at least some embodiments, the instruction is one of a plurality of Sum-Of-Multiply-Accumulate (SOMAC) instructions of an implementation of a neural network. For at least some embodiments, each of the plurality of SOMAC instructions includes at least one of a multiply-accumulate operation, a dot product-accumulate operation, or a convolve-accumulate operation. It is to be understood that some other embodiments include other types of SOMAC instructions.

FIG. 4 shows operation of a SOMAC instruction with 4 terms (for example, a dot product-accumulate operation with 4 terms), wherein the instruction size of the SOMAC instruction is 8, and wherein the instruction size sets the number of iterations performed by the SOMAC instruction, according to an embodiment. Here, owing to the instruction size of the SOMAC being 8, 8 iterations are to be performed to complete the SOMAC instruction.

As previously described, the macro-instruction iterator of the processor determines whether the instruction is a Sum-Of-Multiply-Accumulate (SOMAC) instruction with an instruction size, wherein the instruction size indicates a number of iterations that the SOMAC instruction is to be executed.

As shown, the first operand (operand1) is multiplied by the 8 different iterations of the second operand (operand2). First, a determination is made whether all of the terms of the first operand are zero. If all of the terms of the first operand are zero, then the entire operation of the current SOMAC instruction can be skipped.

As previously described, the processor reads a first source operand of a plurality of source operands of the SOMAC instruction from a register file, wherein the first source operand includes one or more terms, wherein each source operand of the plurality of source operands is a register from a corresponding register file that is an input to the instruction. Further, a macro-instruction iterator of the processor determines if all terms of the first source operand are zero. In this example, not all the terms of the first source operand are zero.

If all of the terms of the first operand are not zero, then a determination is made on each of the sets of the second source operand. As shown in the figure, only the terms of the fourth and sixth sets are zero, and therefore, the corresponding iterations are skipped.

Although specific embodiments have been described and illustrated, the described embodiments are not to be limited to the specific forms or arrangements of parts so described and illustrated. The embodiments are limited only by the appended claims.

What is claimed:

1. A method of processing, comprising:
scheduling, by a scheduler, a thread for execution;
executing, by a processor of a plurality of processors, the thread;
fetching, by the processor, a plurality of instructions for the thread from a memory;
selecting, by a thread arbiter of the processor, an instruction of the plurality of instructions for execution in an arithmetic logic unit (ALU) pipeline of the processor, and reading the instruction; and
determining, by a macro-instruction iterator of the processor, whether the instruction is a Sum-Of-Multiply-Accumulate (SOMAC) instruction with an instruction size, wherein the instruction size indicates a number of iterations that the SOMAC instruction is to be executed, wherein the number of iterations includes multiple iterations;
executing the SOMAC instruction, comprising:
reading, by the processor, a first source operand $A_i$ of a plurality of source operands of the SOMAC instruction from a register file, wherein the first source operand $A_i$ includes multiple terms i, wherein the first source operand $A_i$ includes a vector that is common and same for all iterations of the SOMAC instruction, wherein each source operand of the plurality of source operands is one or more of a plurality of registers from a corresponding register file that is an input to the SOMAC instruction;
determining, by the macro-instruction iterator of the processor, if all terms of the first source operand $A_i$ are zero and accumulating the terms of the first source operand $A_i$ into destination operands C leaves the destination operands C unchanged, thereby allowing the SOMAC instruction to be pruned; and
executing the number of iterations of the SOMAC instruction when all terms of the first source operand $A_i$ are not zero, comprising, for each iteration of the number of iterations, reading a single term of a second operand $B_i[j]$, wherein the second operand $B_i$ includes multiple terms i, reading a destination operand $C[j]$ of the destination operands C, and writing a single multiply-accumulate result back to the destination operand $C[j]$ according to:
$C[j] = \Sigma A_i * B_i[j] + C[j]$; where j is a loop index that varies from 0 to the instruction size and increments each iteration, resulting in a number of destination operands C equal to the instruction size;
wherein for each iteration of the number of iterations:
each of the multiple terms i of the first source operand $A_i$ are multiplied with the single term of the second operand $B_i[j]$ producing a plurality of multiplication results, each of the plurality of multiplication results are added together to produce a summation, and the summation is added to the destination operation $C[j]$ producing the single multiply-accumulate result.

2. The method of claim 1, wherein execution of the SOMAC instruction is skipped and a next instruction is read for execution when all terms of the first source operand are zero.

3. The method of claim 2, further comprising:
selecting, by the thread arbiter of the processor, a second instruction of the plurality of instructions for execution in an arithmetic logic unit (ALU) pipeline of the processor, and reading the second instruction; and
determining, by the macro-instruction iterator of the processor, whether the second instruction is a second Sum-Of-Multiply-Accumulate (SOMAC) instruction with an instruction size of the second instruction, wherein the instruction size of the second instruction indicates a number of iterations of the second instruction that the second SOMAC instruction is to be executed.

4. The method of claim 1, further comprising:
wherein the second operand includes a number of sets of one or more terms, wherein the number of sets is the instruction size;
determining, by the macro-instruction iterator of the processor, an instruction mask, wherein the instruction mask includes a plurality of bits, and each bit is determined based on which sets of the number of sets of the second operand have all terms of the set being zero.

5. The method of claim 4, wherein each bit of the plurality of bits corresponding to a set of the number of sets of the second operand having all terms of zero are reset, and each bit of the plurality of bits corresponding to a set of the number of sets of the second operand having at least one term non-zero are set.

6. The method of claim 5, further comprising:
executing, by the processor, multiply and accumulate operations of the SOMAC operation for the iterations which are not disabled (mask bit is set) and skipping the iterations which are disabled (mask bit is reset) based on the instruction mask.

7. The method of claim 6, further comprising:
adding a sum-of-multiply result to the destination operand C[j]; and
writing the multiply-accumulate result back to the destination operand C[j].

8. The method of claim 1, wherein the instruction is one of a plurality of Sum-Of-Multiply-Accumulate (SOMAC) instructions of an implementation of a neural network.

9. The method of claim 8, wherein each of the plurality of SOMAC instructions includes at least one of a multiply-accumulate operation, a dot product-accumulate operation, or a convolve-accumulate operation.

10. A system, comprising:
a scheduler operative to schedule a thread;
a plurality of processors operative to execute the thread;
logic encoded in one or more non-transitory computer-readable storage media for execution by the plurality of processors and when executed operable to cause a processor of the plurality of processors to operate to:
fetch a plurality of instructions for the thread from a memory;
select by a thread arbiter of the processor an instruction of the plurality of instructions for execution in an arithmetic logic unit (ALU) pipeline of the processor, and read the instruction;
determine, by a macro-instruction iterator of the processor, whether the instruction is a Sum-Of-Multiply-Accumulate (SOMAC) instruction with an instruction size, wherein the instruction size indicates a number of iterations that the SOMAC instruction is to be executed, wherein the number of iterations includes multiple iterations;
executing the SOMAC instruction, comprising:
reading, by the processor, a first source operand $A_i$ of a plurality of source operands of the SOMAC instruction from a register file, wherein the first source operand $A_i$ includes multiple i terms, wherein the first source operand $A_i$ includes a vector that is common and same for all iterations of the SOMAC instruction, wherein each source operand of the plurality of source operands is one of a plurality of registers from a corresponding register file that is an input to the SOMAC instruction;
determining, by the macro-instruction iterator of the processor, if all terms of the first source operand $A_i$ are zero and accumulating the terms of the first source operand $A_i$ into destination operands C leaves the destination operands C unchanged, thereby allowing the SOMAC instruction to be pruned; and
executing the number of iterations of the SOMAC instruction when all terms of the first source operand $A_i$ are not zero, comprising, for each iteration of the number of iterations, reading a single term of a second operand $B_i[j]$, wherein the second operand $B_i$ includes multiple terms i, reading a destination operand C[j] of the destination operands C, and writing a single multiply-accumulate result back to the destination operand C[j] according to:
C[j]=$\Sigma A_i*B_i[j]$+C[j]; where j is a loop index that varies from 0 to the instruction size and increments each iteration, resulting in a number of destination operands C equal to the instruction size;
wherein for each iteration of the number of iterations:
each of the multiple terms i of the first source operand $A_i$ are multiplied with the single term of the second operand $B_i[j]$ producing a plurality of multiplication results, each of the plurality of multiplication results are added together to produce a summation, and the summation is added to the destination operation C[j] producing the single multiply-accumulate result.

11. The system of claim 10, wherein, execution of the SOMAC instruction is skipped and a next instruction is read for execution when all terms of the first source operand are zero.

12. The system of claim 11, wherein the thread arbiter of the processor further operates to:
select a second instruction of the plurality of instructions for execution in an arithmetic logic unit (ALU) pipeline of the processor, and read the second instruction; and
wherein the macro-instruction iterator of the processor further operates to:
determine whether the second instruction is a second Sum-Of-Multiply-Accumulate (SOMAC) instruction with an instruction size of the second instruction, wherein the instruction size of the second instruction indicates a number of iterations of the second instruction that the second SOMAC instruction is to be executed.

13. The system of claim 10, wherein the processor further operates to:
wherein the second operand includes a number of sets of one or more terms, wherein the number of sets is the instruction size;
wherein a macro-instruction iterator of the processor operates to:
determine an instruction mask, wherein the instruction mask includes a plurality of bits, and each bit is determined based on which sets of the number of sets of the second operand have all terms of the set being zero.

14. The system of claim 13, wherein each bit of the plurality of bits corresponding to a set of the number of sets of the second operand having all terms of zero are reset, and each bit of the plurality of bits corresponding to a set of the number of sets of the second operand having at least one term non-zero are set.

15. The system of claim 14, wherein the processor further operates to:
execute multiply and accumulate operations of the SOMAC operation for the iterations which are not disabled (mask bit is set) and skipping the iterations which are disabled (mask bit is reset) based on the instruction mask.

16. The system of claim 15, wherein the processor further operates to:
add a sum-of-multiply result to the destination operand C[j]; and
write the multiply-accumulate result back to the destination operand C[j].

17. The system of claim 10, wherein the instruction is one of a plurality of Sum-Of-Multiply-Accumulate (SOMAC) instructions of an implementation of a neural network.

18. The system of claim 17, wherein each of the plurality of SOMAC instructions includes at least one of a multiply-accumulate operation, a dot product-accumulate operation, or a convolve-accumulate operation.

* * * * *